Aug. 6, 1957   E. F. SALSBURY   2,801,684
POWER OPERATED TIRE BEAD BREAKER
Filed Sept. 2, 1954
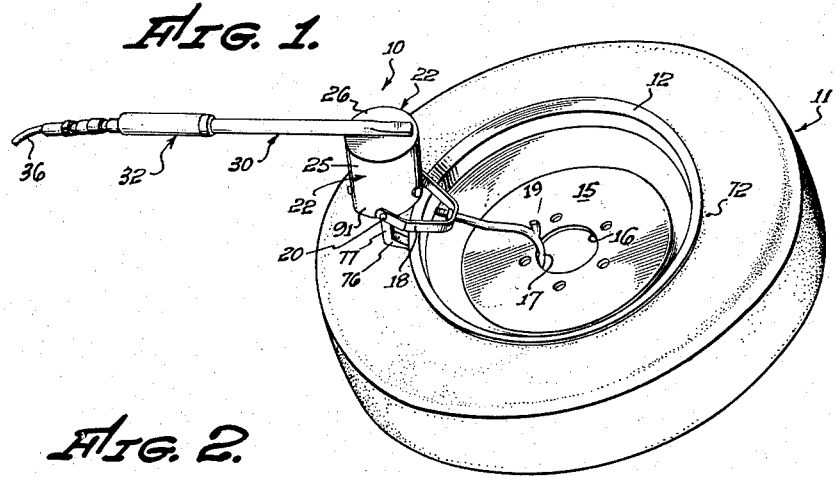
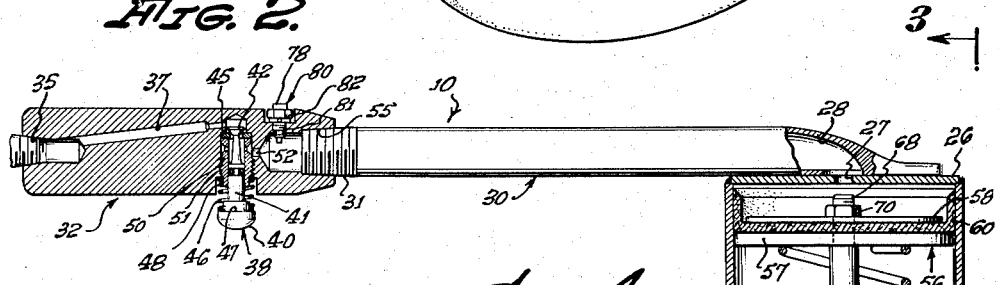
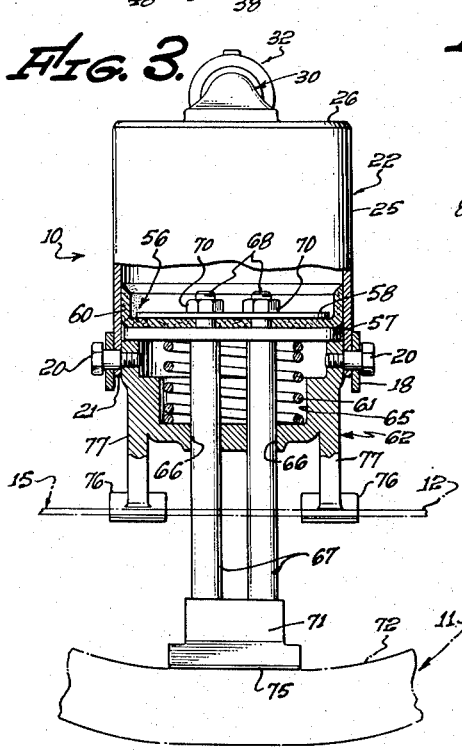
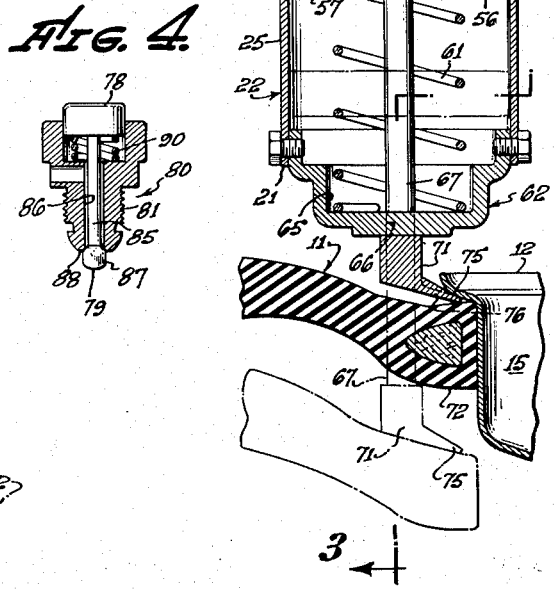
ESLEY F. SALSBURY,
INVENTOR.
By His Attorneys
HARRIS, KIECH, FOSTER & HARRIS.

United States Patent Office 2,801,684
Patented Aug. 6, 1957

2,801,684

POWER OPERATED TIRE BEAD BREAKER

Esley F. Salsbury, Los Angeles, Calif., assignor to Salsbury Corporation, Los Angeles, Calif., a corporation of California Application September 2, 1954, Serial No. 453,776

2 Claims. (Cl. 157—1.17)

The present invention relates to a device employed in the repair of automotive-type tires to aid in the removal of a tire bead from the rim of a wheel upon which the tire has been mounted. It is a general object of the present invention to provide a device which can be easily and conveniently employed to serve this purpose, and which is comparatively simple to construct and operate. Further objects of the present invention as well as many specific advantages of it will be apparent in the remainder of this specification, including the appended claims and the accompanying drawings.

The invention may be briefly summarized as embodying inner and outer shoes which are designed to bear against a tire bead and a wheel rim, respectively; extendible piston means disposed within an air cylinder for moving the inner shoe; arm means provided with a handle so as to be capable of being used in positioning these inner and outer shoes in the desired operative positions and in controlling the operation of the air cylinder employed; and yoke and hook means which are designed to further be used in governing the location of the entire apparatus during its use. The herein described invention is more specifically summarized by the appended claims forming a part of this specification. The actual details of the construction employed are best understood with reference to the accompanying drawing, in which:

Fig. 1 is an isometric view of a device of the present invention in use;

Fig. 2 is an enlarged, partially cross-sectional view illustrating certain constructional details of the apparatus shown in Fig. 1 and the operation of this apparatus;

Fig. 3 is a view taken in the general direction on the line 3—3 of Fig. 2; and

Fig. 4 is an enlarged view of a valve employed with the apparatus illustrated in the other figures.

In Fig. 1 of the drawing there is shown an apparatus 10 of the invention employed upon a tire 11 in such a manner as to aid in the removal of this tire from the rim 12 of a wheel 15 having a central axle opening 16. The position of the device 10 is maintained during its operation by means of a hook 17 engaging the opening 16. This hook is preferably mounted so that it may be turned to any desired angle upon a yoke 18 secured by bolts 20 to opposite sides of an end 21 of a cylindrical casing 22. Further, this hook 17 is provided with a small projection 19 adjacent its back edge, this projection serving as a second hook for use with an opening of different size than the opening 16. This cylindrical casing has a side wall 25 and a closed end wall 26 in which there is disposed an opening 27. This opening is in communication with a passage 28 formed within a tubular arm 30 secured to the end wall 26. The tubular arm in turn carries at its end 31 remote from the cylindrical casing 22 a handle 32 which is provided with an end tapped opening 35 designed to be connected to a conventional air hose 36. This tapped opening 35 leads to a channel 37 communicating with a valve 38 employed in governing the admittance of air to the tubular arm 30 and to the cylindrical casing 22.

The valve 38 includes a control knob 40 to which there is attached a valve stem 41 leading through the entire valve 38 to a valve body 42 which is normally urged against a valve seat 45 by means of a spring 46 disposed between a shoulder 47 on the knob 40 and an internal shoulder 48 formed within the handle 32. The valve 38 is secured within a cavity 50 within the handle 32 by means of threads 51, and is provided with internal passages 52 leading from around the valve stem 41 to the end 31 of the tubular arm 30 so as to be in communication with this end 31 by means of an enlarged, tapped cavity 55, in which the end 31 is secured.

Within the cylindrical casing 22 there is secured a piston 56 formed of two metal members 57 and 58, between which there is disposed a cylindrical section 60 of leather, or like material, which normally bears against the side wall 25. This piston is capable of moving against a spring 61 towards a head 62 secured to the end 21 of the cylindrical casing 22 so as to be spaced generally beyond this cylindrical casing. The head 62 includes an internal cylindrical cavity 65 against which the spring 61 bears, and two adjacent openings 66 which are designed to carry piston rods 67 secured to the metal members 57 and 58 and the leather member 60 by means of threaded heads 68 and nuts 70.

The piston rods 67 are joined together by a common inner shoe 71, which, as is best illustrated in Figs. 2 and 3 of the drawings, is designed to rest against the bead 72 of a tire 11 during use of the device. The inner shoe 71 includes a projecting end 75 which is adapted to be fitted under the rim 12 of the wheel 15 when the hook 17 is positioned within the axle opening 16, substantially as shown in Fig. 1, by appropriate pressure being exerted upon the handle 32. It will at once be apparent that the pressure exerted on this handle acts through the tubular arm 30 which serves substantially as a lever arm during this positioning operation. Also, during the positioning operation, outer shoes 76 attached to the head 62 by means of arms 77 are located between the rim 12 of the wheel 15 and the bead 72 of the tire 11. Once these various parts have been located in this manner, the apparatus 10 is normally used by admitting air through the valve 38 and the handle 32 by pressing upon the control knob 40. This serves to force the piston 56 downward within the cylindrical casing 22, moving the inner shoe 71 with respect to the outer shoes 76. As this occurs, the bead 72 of the tire 11 is forced from the rim 12.

Once the movement of the bead 72 indicated in the preceding paragraph has been completed, it is possible to release the air pressure within the cylindrical casing 22 by pressing upon a knob 78 of another valve 80 located within the handle 32 so as to be in communication with the cavity 55. This valve 80 includes threaded means 81 used in attaching the valve within a cavity 82 in the handle 32; it also includes a valve stem 85 secured to the control knob 78 so as to project through another passage 86 to within the cavity 55. Here the valve stem 85 is provided with an enlarged head 87 which is adapted to serve as a valve body moving against an appropriate valve seat 88. With this construction, when the knob 78 is forced towards the handle 32, air escapes from the cylinder 22 through the tubular arm 30 and this valve 80 out through the passage 86 formed within the valve. The valve 80 is normally maintained in a closed position by means of a spring 90 located between the knob 78 and a cavity 82. The outward movement of air from within the cylindrical casing 22 when the valve 80 is opened is caused by the spring 61 pushing the piston 56 upwards. This spring automatically serves to retract the inner shoe 71 to its initial position where it is level with the outer shoes 76.

Those skilled in the art will realize that the herein described invention is a very efficient, convenient device for the broad purpose intended. Its use is not restricted to the precise method or manner of operation herein described. Thus, it is possible to use the hook 17 and the yoke 18 so as to attach the apparatus 10 to an appropriate shaft or other member upon which a wheel 15 is mounted as during various balancing or other operations. It is possible to substitute for the hook 17 a hook attached to the end of a chain which is adjustably secured to the yoke 18. This construction is advantageous for many applications because of its extreme flexibility, since the chain can be shortened or lengthened as required. The arrangement of parts used with this invention makes towards extreme flexibility of operation. The precise apparatus illustrated herein has proved itself in practice to be a very convenient, usable tool which serves to accomplish a purpose which previously has been very troublesome.

I claim as my invention:

1. An apparatus designed to be utilized in the removal of a tire from the rim of a wheel upon which the tire has been mounted which comprises: an arm having a handle at its outer end; a cylindrical casing rigidly secured to the inner end of said arm; a yoke pivoted to the lower portion of said casing; a hook adjustably secured to said yoke and so placed as to engage the central axle opening of the wheel; two arms rigidly secured to said casing and projecting downwardly from said casing when the apparatus is in use; two outer shoes each integral with one of said arms and so formed as to be capable of partial insertion between a bead of a tire, as mounted on a wheel, and the rim of the wheel; a piston sliding freely in gas-tight relationship with the walls of a cylindrical opening formed in said casing; valve means through which air can be supplied above said piston to said cylindrical opening from an air hose; a piston rod guided through an opening in the bottom of said casing; and a common inner shoe carried on said piston rod and so placed as to engage the side of the bead of the tire between the lower ends of said outer shoes.

2. An apparatus as defined in claim 1 in which said arm and handle have a central passage through which air may pass from said outer end of said arm into the interior of said casing, and in which said valve means is situated in said handle and includes a spring closed, manually opened valve for closing said central passage.

References Cited in the file of this patent

UNITED STATES PATENTS

| | | |
|---|---|---|
| 2,495,117 | McCollister | Jan. 17, 1950 |
| 2,606,602 | Manupello | Aug. 12, 1952 |
| 2,679,896 | Branick | June 1, 1954 |
| 2,684,710 | Calvin | July 27, 1954 |